(12) United States Patent
Coombe

(10) Patent No.: US 6,227,071 B1
(45) Date of Patent: May 8, 2001

(54) AXLE AND BEARING ARRANGEMENT FOR A BICYCLE PEDAL

(76) Inventor: William Blake Coombe, 5765 Arapahoe Rd., Unit B, Boulder, CO (US) 80303

( * ) Notice: Subject to any disclaimer, the term of this patent is extended or adjusted under 35 U.S.C. 154(b) by 0 days.

(21) Appl. No.: 09/390,465

(22) Filed: Sep. 7, 1999

(51) Int. Cl.$^7$ .................................................. B62M 3/08
(52) U.S. Cl. ............................................ 74/594.4; 384/454
(58) Field of Search ........................... 74/594.4, 594.1; 384/454, 494, 545, 458

(56) References Cited

U.S. PATENT DOCUMENTS

| | | | |
|---|---|---|---|
| 637,657 | * 11/1899 | Pedersen | 74/594.4 |
| 3,131,006 | * 4/1964 | Anderson | 384/454 |
| 3,424,507 | * 1/1969 | Rollins et al. | 384/454 |
| 4,398,434 | * 8/1983 | Kimura | 74/594.4 |
| 4,825,719 | * 5/1989 | Romano | 74/594.4 |
| 5,379,665 | * 1/1995 | Nagano | 74/594.4 |

* cited by examiner

*Primary Examiner*—Mary Ann Green

(57) ABSTRACT

A bicycle pedal adapted to be attached to a crankarm having a pedal axle including an attachment portion formed at one end thereof for attachment to the crankarm, the pedal axle having a small diameter portion formed adjacent the attachment end. A first and second needle bearings are arranged in the region of the small diameter portion of the pedal axle and spaced apart from each other axially for supporting a tread surface/s in a radial direction of the pedal axle. A ball bearing is disposed between the first and second needle bearing for maintaining axial positioning of the pedal body.

2 Claims, 4 Drawing Sheets

AXLE AND BEARING ARRANGEMENT FOR A BICYCLE PEDAL

BACKGROUND

1. Field of Invention

The invention relates to bicycles and other human powered machines. More specifically to a bicycle pedal having a pedal body, rotatably supported by bearings, on a pedal axle which affixes to a crankarm of a bicycle.

2. Description of Prior Art

The axles and bearings of bicycle pedals are subjected to high static and dynamic loads. Competitive and serious cycling enthusiasts, in particular, commonly place very high demands on these components of a bicycle pedal. This has led to the premature and sometimes unsafe failures of these components in many bicycle pedals.

The axle and bearing arrangement used in conventional pedal designs, incorporate an inner and an outer row of ball bearings with an adequately proportioned, relatively long pedal axle. The inner row of ball bearings is typically located approximately beneath the inside edge of where the cyclist's foot contacts with the pedal, and correspondingly, the outer row of balls is located approximately beneath the outside edge of the cyclist's foot. Designs of this type have the advantage of rather evenly distributing the loads, which are generated by the cyclist, between these two sets of bearings. This allows the sets of bearings to wear nearly evenly, thus preventing one of the set of bearings from wearing out prematurely. The overall life span and time intervals between servicing the pedals are relatively long with this type of design.

A disadvantage of this type of design, however, is that the diameter of the pedal body around the rows of bearings is relatively large. And, because these rows of bearings are placed directly beneath the cyclist's foot, this results in the cyclist's foot being displaced a rather sizable distance away from the pedal axle. This relatively large distance reduces the stability of the cyclist's foot on the pedal, as well as, reduces the efficient energy transfer from the cyclist through the pedals. Therefore, these pedals have lessened comfort and efficiency when compared to more modem pedal designs that incorporate lower profile types of bearing arrangements, which bring the cyclist's foot closer to the pedal axle.

Another disadvantage of this conventional type of pedal design is that, due to the relatively long length of the axle, the outer edge of the pedal body is a considerable distance away from the bicycle's crankarm. This increases the likelihood of the pedal body striking the ground while pedaling through a comer, which is potentially dangerous, and a serious disadvantage to competitive cyclists who need to be able to pedal through turns to keep up their momentum.

A further disadvantage associated with these pedals is their relatively large size and heavy weight which makes them less efficient and aerodynamic, overall.

U.S. Pat. No. 4,882,946 describes a different type of axle and bearing arrangement intended to improve upon some of the disadvantages of the more conventional type which was just described. In a similar fashion as the conventional arrangement, this design uses a relatively large diameter, inner row of ball bearings, for carrying the inner portion of the loads generated by the cyclist. However, instead of placing this inner row of bearings directly beneath the inside of the cyclist's shoe, as in the conventional design, they are moved to the inside, out from under the cyclist's shoe, as close as possible to the crank arm of the bicycle.

A much smaller in diameter row of needle roller bearings, is used in conjunction with the inner row of ball bearings to support the radial loads applied by the cyclist. Despite their relatively small diameter, the line type of contact which needle rollers make, with their mating raceway surfaces, gives them the capability of carrying the entire radial loads generated by the cyclist. This enables them to be placed more directly beneath the center of the cyclist's foot. Therefore, the larger diameter inner row of ball bearings carry the entire thrust loads, while also positioning the pedal body on the axle, and the smaller diameter, outer row of needle bearings support nearly the entire radial load. This allows the treading surface of the pedal body to be located closer to the axle than the larger diameter portion of the pedal body which houses the inner row of ball bearings. This advantageously brings the cyclist's foot closer to the pedal spindle, for improved stability and efficiency. Also, because the outer row of needle bearings are placed closer to the center of the pedal body, beneath the cyclist's foot, the axle is made shorter than in a conventional designs. This enables the outer, bottom portion of the pedal body to be cut away, thus increasing the pedals clearance while leaning the bicycle which improves safety and cornering ability.

Though this design does offer advantages over the more conventional pedal design, there are disadvantages of the design. The larger diameter portion of the pedal body housing, which contains the inner row of ball bearings, is sufficiently wide to cause axial displacement of the cyclist's shoes and feet, which can result in poor biomechanical alignment of the leg joints of some cyclists. This decreases efficiency and can lead to stress induced injuries with cyclists whom need their feet placed more closely to the inside of the pedal due to their particular anatomy.

Another disadvantage of this design is the relatively heavy weight of the pedals. This is due to the extended length and increased diameter of the pedal body which is necessary to accommodate the size and location of the inner bearing.

U.S. Pat. No. 5,379,665 describes various axles and bearing arrangements using two, relatively small diameter, rows of ball bearings, in conjunction with a single row of needle bearings. The embodiment shown in FIG. 1 incorporates a relatively short axle which advantageously enables the cutting away of the outer, bottom side of the pedal body, for improved cornering ability.

A serious disadvantage of this design, however, is the relatively low load rating and close spacing of the two, inner and outer, rows of ball bearings. If the center of the load applied by the cyclist is not closely positioned over the central row of needle roller bearings, but rather, as is common while riding, is centered over the far inside or outside areas of the pedal body, overloading of the ball bearings can occur. This causes the pedals to require frequent rebuilding which is expensive and inconvenient for the cyclist.

Further, the close spacing of the rows of ball bearings gives poor lateral stability to the pedal body, which can result in the pedal body rubbing against the axle when the center of the load applied by the cyclist is over the far inside, or outside, of the pedal body. This rubbing causes undesirable friction, decreasing efficiency.

Yet another disadvantage of this design is the placement of the row of relatively large diameter ball bearings, on the larger diameter section of the axle, located to the inside of the row of needle roller bearings. This increases the overall height of the pedal body, negating the low profile benefit of the needle roller bearings, disadvantageously resulting in the cyclist's foot being placed higher above the pedal axle than is possible in other designs.

An examination of the alternative axle and bearing arrangement as shown in FIG. 3 of the same patent, reveals that this design shares the same disadvantages of the previously discussed design. Once again, the use of relatively low load rated ball bearings on the outside of the pedal axle, where the loads applied by the cyclist are often concentrated, results in these bearings being easily overloaded. Also, the close spacing of the inner and outer bearings causes poor lateral stability of the pedal body. Additionally, the relatively large cross section of the pedal body results in the cyclist's foot being placed an undesirable distance above the pedal axle.

FIG. 4 of the same patent shows yet another embodiment in which needle roller bearings are placed to the outside of the axle. A major disadvantage of this design is the significantly reduced axle strength caused by the decreased axle diameter which is required to install the outer raceway used with the ball bearings. Additionally, the undesirable height of the pedal body is unchanged from the other embodiments.

A further disadvantage of bicycle pedals, in general, is the lack of a simple means for maintaining and lubricating the axle bearings. Because pedals are sometimes subjected to harsh operating environments, which lead to rapid deterioration of the bearings if they are not properly maintained, it is desirable to have a quick and simple method of lubricating and cleansing the bearings of contaminants. In many systems, it is necessary to disassemble the pedal for cleaning and relubrication. This is time consuming and can be expensive, often causing it to be neglected, which results in the premature failure of the components of the bearing system.

It would be advantageous to have a means for simply lubricating the bearings of a pedal quickly and without requiring special tools or disassembly. Additionally, ideally the lubrication process would also serve to cleanse the axle seals and bearings of any contaminants that may have worked into them. In this way disassembly for cleaning and lubrication would never be required.

OBJECTS AND ADVANTAGES

It is the object of the invention to overcome the disadvantages of the prior art mentioned.

Accordingly, one object of the invention is to provide an axle and bearing arrangement for a bicycle pedal, which advantageously incorporates an axle of high strength, with a highly load rated bearing arrangement, capable of enduring high level use, for long life.

Another object of the axle and bearing design is to provide a very low profile pedal, advantageously bringing the cyclist's foot as close as possible to the pedal axle for maximum stability and efficiency, without sacrificing strength or reliability of these components of the pedal.

A further object of the invention is to advantageously provide a simple means for quickly lubricating and cleansing the axle bearings and seal/s, so that disassembly is never required.

SUMMARY OF THE INVENTION

The invention consists of an axle, bearing arrangement and pedal body, or removable raceways within a pedal body, for a bicycle pedal.

The bearing arrangement incorporates an inner, central and outer row, of antifriction bearings, arranged for high load carrying ability and low profile. The inner and outer row of bearings used are needle roller bearings. These bearings make line contact with their corresponding raceways, enabling them to endure high radial loads for long life spans. The central row of bearings are four point, angular contact, thrust load carrying ball bearings. The ball bearing's raceways are formed, or adjusted, to have a slight clearance fit with the balls, such that the entire radial load applied to the pedal body is supported by the adjacent, inner and outer rows, of needle roller bearings. This arrangement serves to insure the longest life and even wear of the bearings, by isolating the relatively high radial loads to the highly load rated, needle rollers, and, the relatively low thrust loads to the relatively low load rated, ball bearings.

The axle is through hollowed for weight reduction, as well as, for enabling the injection of lubricant through its bore for maintaining the bearings and flushing the axle seal/s.

The design offers maximum reliability, durability, and efficiency, with simple maintenance. Other features and advantages of the present invention will be apparent from the following description of the preferred embodiments taken with reference to the drawings.

DETAILED DESCRIPTION OF THE INVENTION

Figure 1:
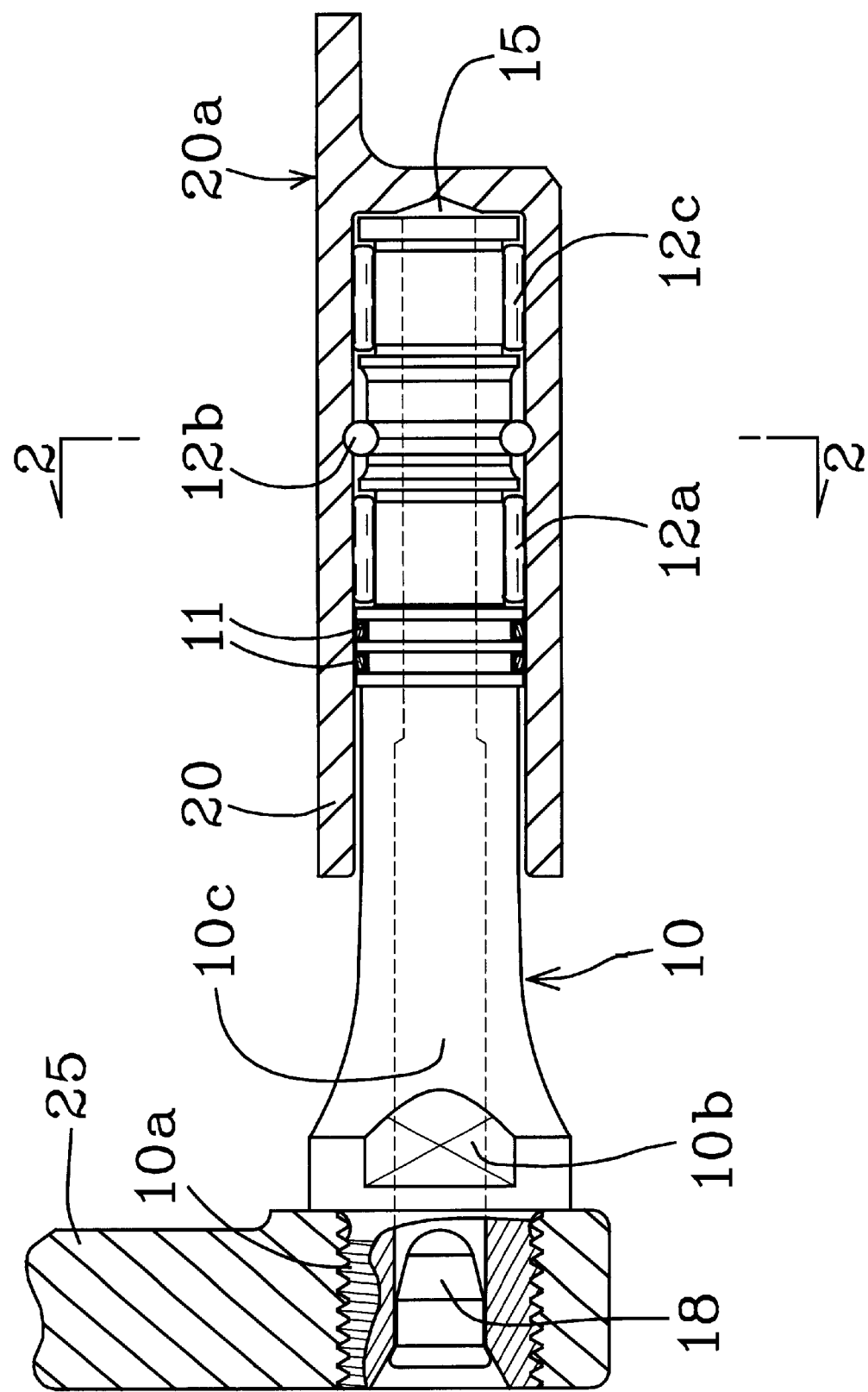
FIG. 1 is a sectional view of a bicycle pedal in the first embodiment of the present invention.

FIG. 1 shows a bicycle pedal having a pedal axle 10 attached in cantilever mode to the free end of a crankarm 25 of a bicycle crankset. The pedal axle 10 rotatably supports a pedal body 20 with the use of multiple rows of antifriction bearings 12a, 12b, 12c. The pedal axle 10 typically has a threaded end 10a and wrench flats 10b which enable the axle to be tightened against the crankarm 25. The axle 10 is preferably made of a high strength steel alloy for maximum durability and wear resistance to the bearings 12a/b/c, which ride on its outer surface.

For improved visualization in FIG. 1, only a top and bottom bearing, of each row of bearings, is shown in the illustration. It is to be understood that in actuality these rows of bearings are filled around their entire circumference as shown, for example, in FIG. 2.

Figure 3:
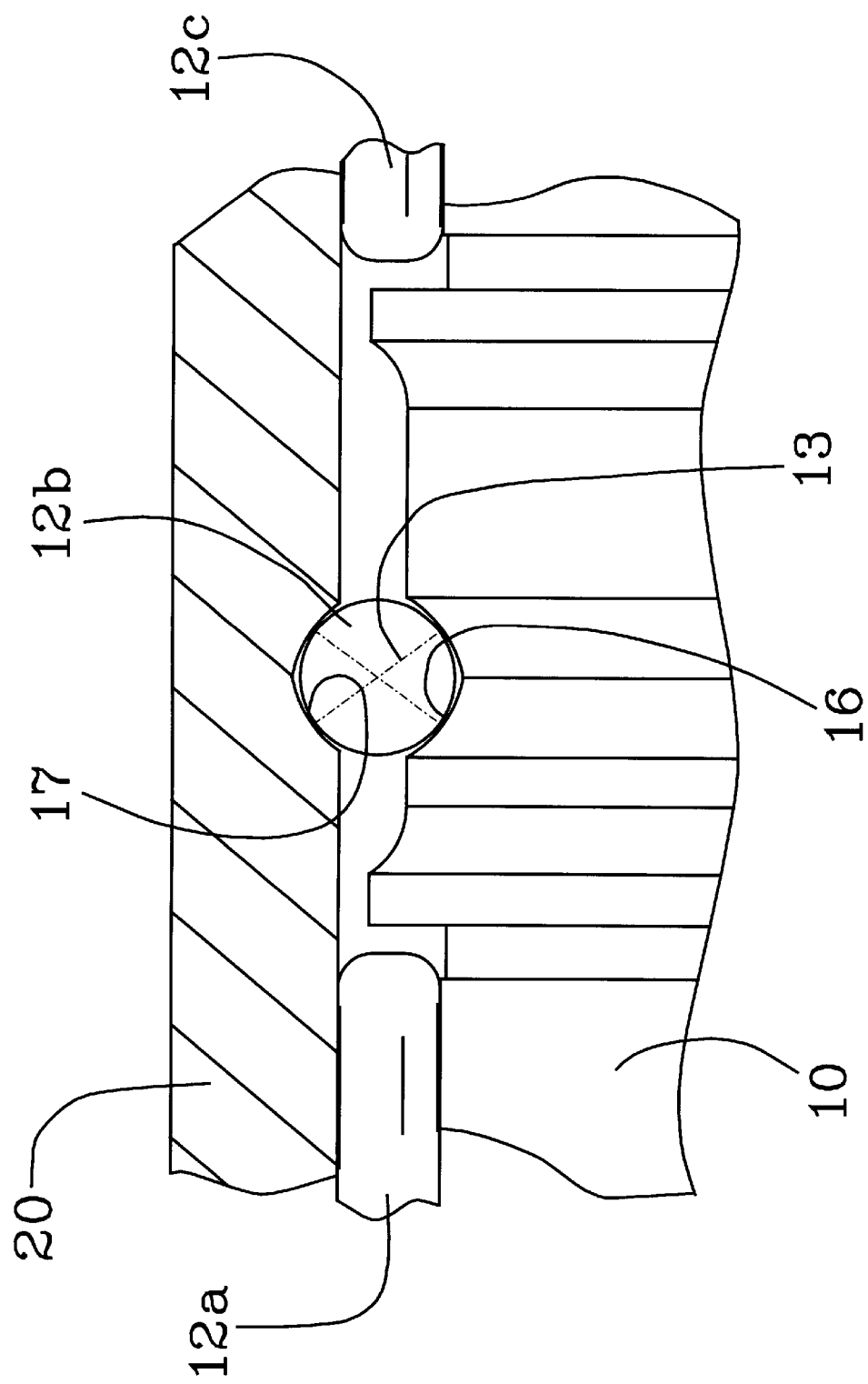
FIG. 3 is a close-up sectional view of a bearing arrangement for use in a bicycle pedal.

A central row of small diameter ball bearings 12b are used to carry thrust loads, as well as to keep the pedal body 20 positioned on the axle 10. Referring to FIG. 3 the bearings 12b have a slight clearance fit with their raceways 16/17 such that the entire radial loads applied to the pedal body 20 are supported by the inner and outer rows of needle bearings 12a/c. This insures even wear amongst the three sets of bearings.

The raceways 16/17 are preferably gothic arch shaped to cause angular lines of contact 13 between the pedal body 20 and the axle 10. This increases the thrust load capability of the bearing when compared to using a raceway comprised of only a single radius, which results in a nearly vertical line of contact between the pedal body 20 and the axle 10.

Figure 2:
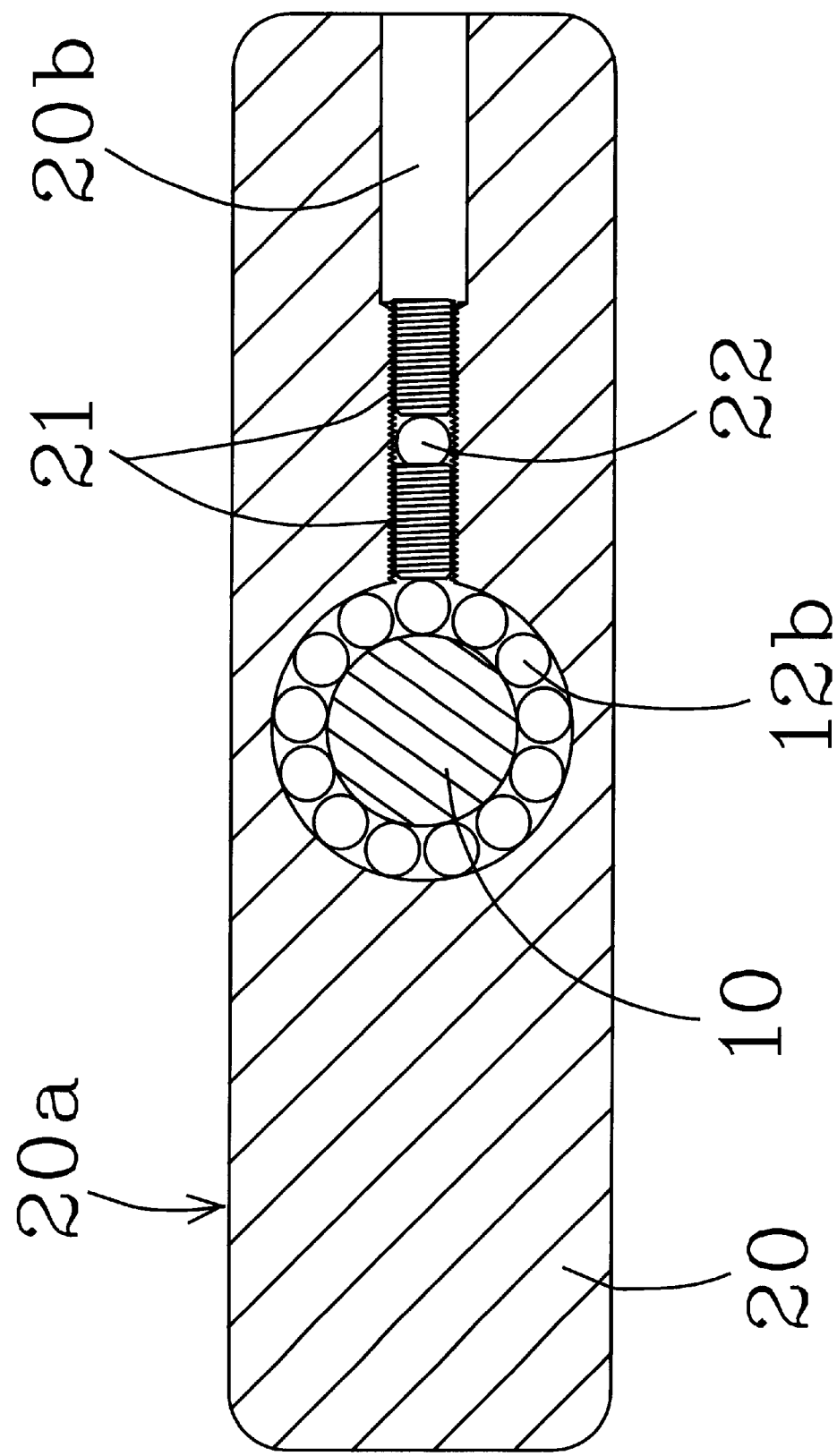
FIG. 2 is a section taken on line 2—2 of FIG. 1.

FIG. 2 shows a cross sectional view of line 2—2 of FIG. 1. In this first embodiment of the invention, the balls 12b are loaded through a loading port 20b into the axle's 10 raceway and an integral raceway which is formed into the pedal body 20. This embodiment advantageously brings the pedal body's treading surface 20a into very close proximity with the axle 10, providing a very stable pedal platform and high energy transfer from the cyclist. Referring to FIGS. 1 and 2 the axle 10 and its bearings 12a/b/c are installed into the pedal body 20 as follows; first, all of the needle rollers 12a/c are placed in their respective raceways around the axle 10 prior to inserting the axle into the pedal body 20; the balls 12b are then loaded through the loading port 20b of the pedal body and the set screws 21 are installed with the front of the inner set screw having a slight clearance with the ball bearings, sufficient to enable free rotation of the bearings. A ball bearing 22 is installed between the first and second set screws 21 to prevent rotation of the inner set screw when the outer set screw is tightened to lock it in place.

Figure 4:
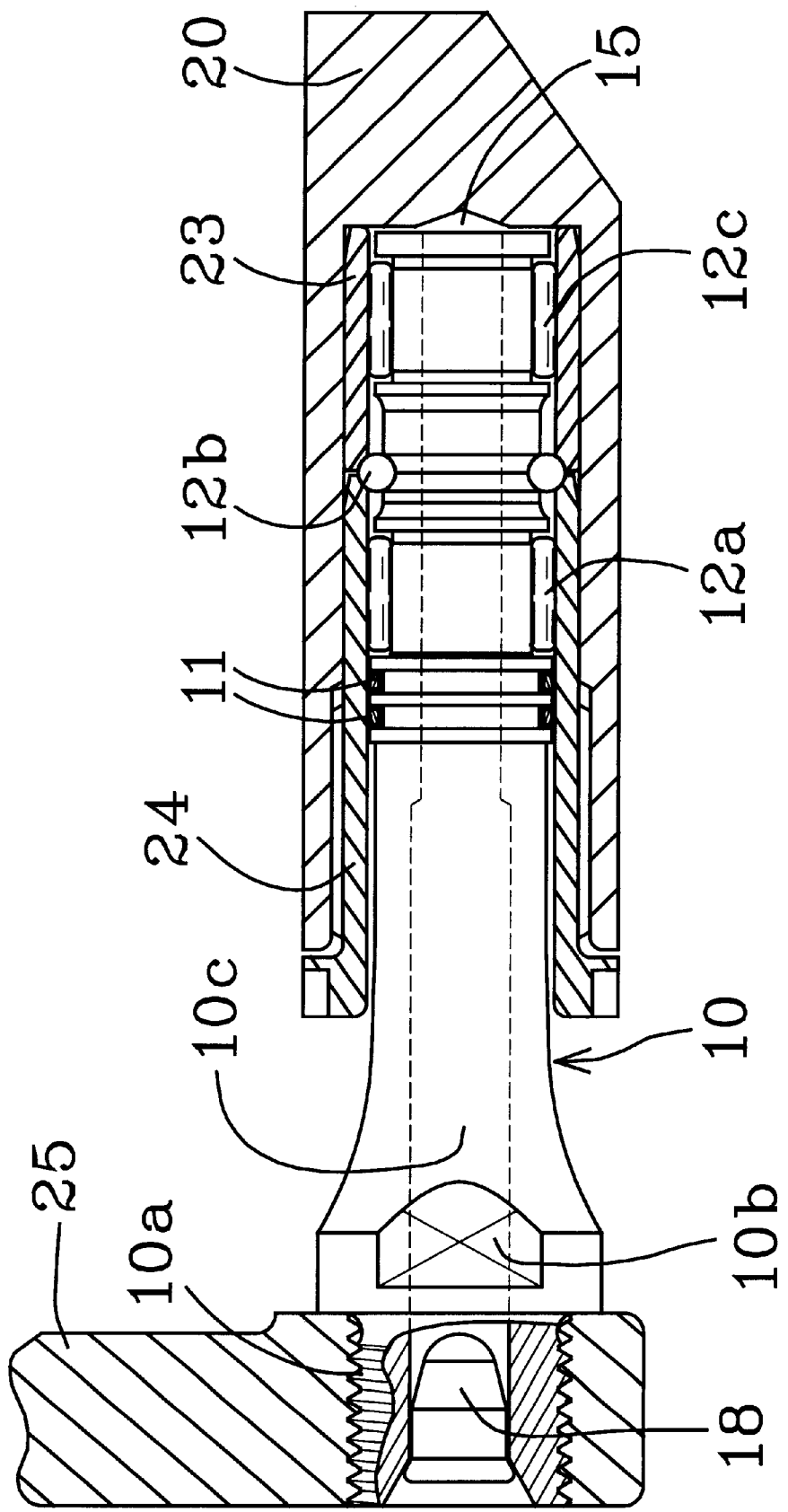
FIG. 4 is a sectional view of a bicycle pedal in a second embodiment of the invention.

FIG. 4 shows a second embodiment of the invention in which the pedal body 20 uses separate internal raceways 23/24. This embodiment enables the pedal body 20 to be made of a different material than the bearing raceways, which must be made of a strong and wear resistant material. In assembling the pedal, first the outer raceway 23 is installed in the pedal body 20, preferably with a close or light press fit. The inner row of needle bearings 12a are then placed around the axle 10 before sliding the inner adjustable raceway 24 over the axle and bearings 12a. Having accomplished this, the remaining rows of bearings 12b/12c are placed around the axle and the entire assembly is installed into the pedal body 20. The inner raceway 24 is threaded, or has other means for adjustment, to allow adjustment between it and the outer raceway 23 to obtain a slight clearance fit with the ball bearings 12b. This insures that the radial loads are supported entirely by the needle bearings 12a/c for even wear of the entire bearing assembly.

Though these embodiments of the invention as just described are the preferred bearing arrangement and methods for installing the bearings and their raceways, there are other methods and configurations which can also be used which are in the same spirit and scope of the invention. For example, the pedal body could be reconfigured so that the installation of the bearing components would be from both the inside and the outside of the pedal body, or from just the outside of the pedal body. Additionally, a split shell type of pedal body could be used which would tighten around the bearing components.

Further, the rows of needle bearings could be substituted with cylindrical bushing type bearings, which have the same line type of contact. This might be used to reduce manufacturing costs, however, at the expense of decreased efficiency, due to the higher friction typically encountered with this type of bearing.

Additionally, in a similar manner, the ball bearings 12b could be replaced with a thrust type of bushing/washer arrangement, or a pin/s through the pedal body which would intersect into a groove in the axle, allowing free rotation while simultaneously keeping the axle and the pedal body axially positioned relative to one another. This arrangement would most likely increase friction, as well, and is therefore not the preferred method for maximum efficiency.

The axle 10 shown in FIGS. 1 and 4 is through hollowed, having an inner bore 10c. The bearing assembly is relubricated and the axles seal/s 11 simultaneously flushed by simply removing an axle end plug 18, allowing lubricant injection through the axle. This advantageously eliminates the need for disassembling the pedal for cleaning and lubricating.

The invention advantageously provides high efficiency with lasting durability, while requiring minimal and simple maintenance.

While the preferred embodiments have been described using specific terms, such descriptions are for illustrative purposes only, and it is to be understood that changes and variations may be made without departing from the spirit or scope of the invention, which is defined in the following claims.

I claim:

1. A bicycle pedal adapted to be attached to a crankarm comprising:

a pedal axle having an attachment portion formed at one end thereof for attachment to the crankarm, said pedal axle defining an elongated proximal portion adjacent said attachment portion and a small diameter portion formed adjacent the other end thereof and having a smaller diameter than the attachment portion;

a first and second needle bearings arranged in a region of the small diameter portion and spaced apart from each other axially of the pedal axle for supporting a tread surface/s in a radial direction of the pedal axle;

a ball bearing disposed in said region of the small diameter portion, wherein said ball bearing is disposed between said first needle bearing and said second needle bearing; and a pedal body rotatably supported on the small diameter portion through the first and second needle bearings and the ball bearing, said pedal body defining said tread surface/s on a surface/s thereof.

2. A bicycle pedal adapted to be attached to a crank arm comprising:

a pedal axle having an attachment portion formed at one end thereof for attachment to the crankarm, said pedal axle defining an elongated portion extending from the adjacent said attachment portion, said elongated portion comprising inner, central and outer bearing surfaces spaced axially along its outer circumference;

a pedal body including one or more treading surfaces, said pedal body having an internal transverse bore, said transverse bore locating a set of bearing surfaces assembled within, or, said transverse bore having a set of bearing surfaces as an integral part thereof, said bearing surfaces of the transverse bore mating with said bearing surfaces of the elongated portion of the pedal axle, with said mating inner and outer bearing surfaces rotatably supporting said treading surface/s in a radial direction of the pedal axle with line type contact between the bearing surfaces of the pedal axle and the pedal body's transverse bore, and, said central bearing surface of said pedal axle rotatably supporting the pedal body axially with a mating central bearing surface of the pedal body's transverse bore.

* * * * *